United States Patent [19]

Bruce

[11] Patent Number: 5,649,602
[45] Date of Patent: Jul. 22, 1997

[54] WAVY COULTER

[76] Inventor: Douglas G. Bruce, 2223 Fourth St., Perry, Iowa 50220

[21] Appl. No.: 540,544

[22] Filed: Oct. 6, 1995

[51] Int. Cl.⁶ .................................................. A01B 49/02
[52] U.S. Cl. ........................................... 172/604; 172/518
[58] Field of Search ............................... 172/604, 537, 172/555, 548, 518

[56] References Cited

U.S. PATENT DOCUMENTS

| | | | |
|---|---|---|---|
| 323,343 | 7/1885 | Dow | 172/604 X |
| 371,051 | 10/1887 | Foster | 172/555 X |
| 395,638 | 1/1889 | Stuart | 172/604 X |
| 507,894 | 10/1893 | Emans | 172/604 X |
| 809,888 | 1/1906 | Avery | 172/604 X |
| 1,220,475 | 3/1917 | Treadwell | 172/604 X |
| 1,411,196 | 3/1922 | Smith | 172/555 X |
| 2,406,553 | 8/1946 | Mader | 172/604 X |
| 2,575,321 | 11/1951 | Traver . | |
| 3,122,111 | 2/1964 | Taylor, Sr. | 172/604 X |
| 3,621,922 | 11/1971 | Hinken | 172/555 |
| 3,766,988 | 10/1973 | Whitesides | 172/555 X |
| 4,280,565 | 7/1981 | van der Lely | 172/555 X |
| 4,745,978 | 5/1988 | Williamson . | |
| 4,947,770 | 8/1990 | Johnston . | |
| 5,299,647 | 4/1994 | Mudd et al. | 172/555 |
| 5,517,932 | 5/1996 | Ott et al. | 172/604 X |

FOREIGN PATENT DOCUMENTS

| | | | |
|---|---|---|---|
| 1272610 | 7/1968 | Germany | 172/604 |
| 86413 | 10/1955 | Norway | 172/555 |
| 976872 | 12/1982 | U.S.S.R. | 172/555 |
| 1428240 | 10/1988 | U.S.S.R. | 172/604 |
| 590435 | 7/1947 | United Kingdom | 172/555 |

*Primary Examiner*—John A. Ricci
*Assistant Examiner*—Christopher J. Novosad
*Attorney, Agent, or Firm*—Henderson & Sturm

[57] ABSTRACT

The present invention provides a wavy coulter having a plurality of waves, each wave defined by a crest and an adjacent valley. Each crest and valley extends back from the peripheral edge of the coulter in respective adjacent lines disposed at a predetermined acute angle with respect to the radius of the coulter body. The coulter is mounted on an implement time such that a leading peripheral edge of the coulter rotates in a downward direction as it enters the soil, and the lines of each crest and valley enter the soil at a nearly vertical orientation. A uniform narrow band of fractured soil is, thus, prepared by the coulter since soil compaction is minimized.

7 Claims, 1 Drawing Sheet

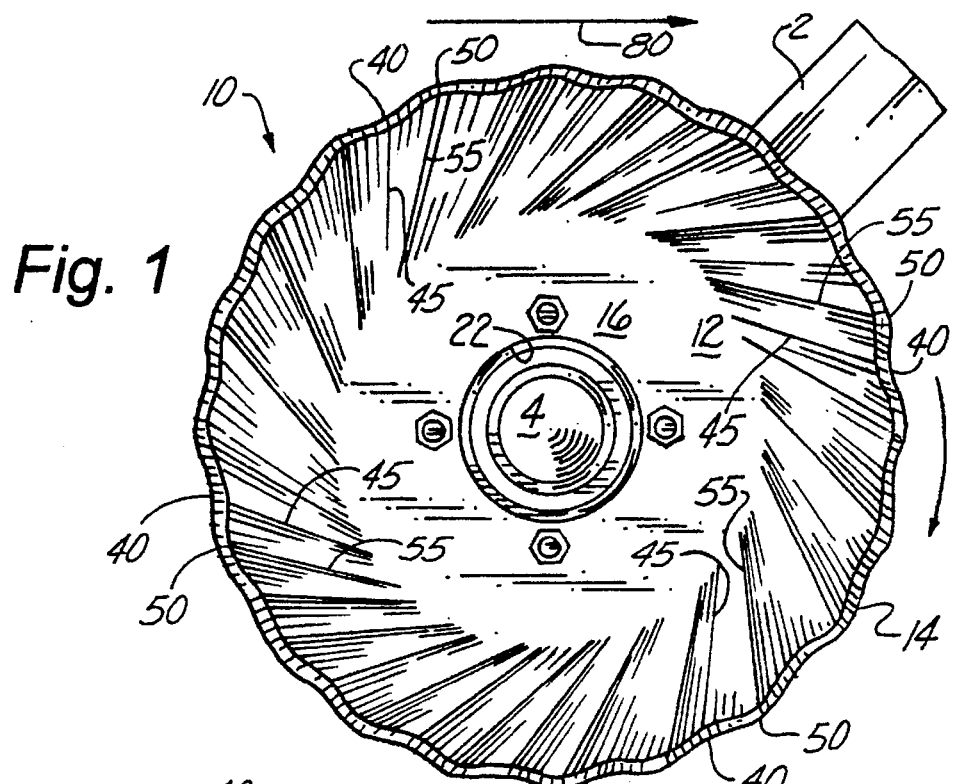
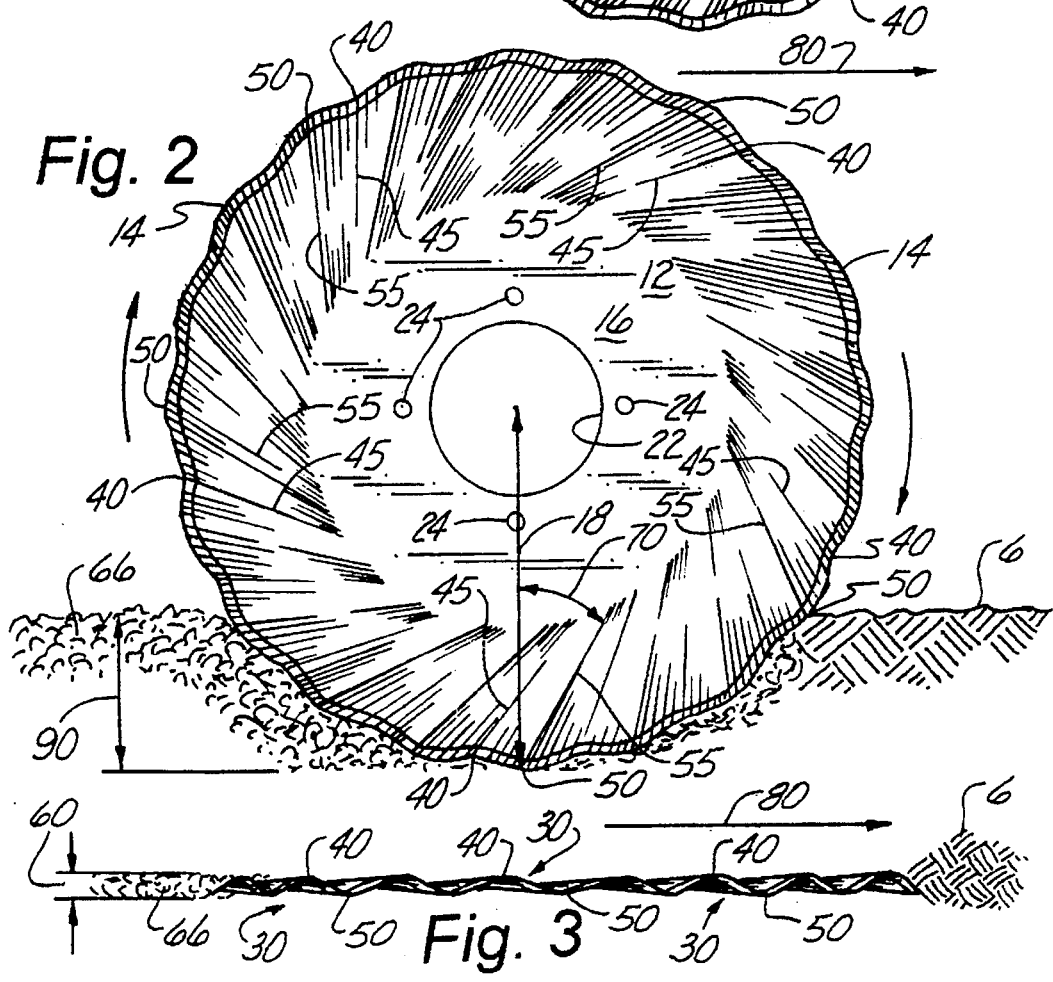

WAVY COULTER

TECHNICAL FIELD

This invention relates to tillage tools and, more particularly, to a wavy coulter.

BACKGROUND ART

Wavy coulters are presently used ahead of no-till implements—such as a planter—to fracture a narrow band of soil to prepare the soil to receive the no-till implement. The coulters are set at a sort penetrating depth of about four inches, and the amplitude of the wave from crest-to-valley is about one to two inches and generally defines the width of the band. These traditional wavy coulters are designed for only one speed, and if they go faster they throw great amounts of dirt.

The crests and valleys on presently available wavy coulters are positioned to extend out from the center of the coulter in a line generally coincident with the radius of the coulter. As each wave enters the soil, the line of the wave enters the soil at an angle with respect to vertical. Each wave, therefore, tends to compact the soil and occasionally throw lumps of the compacted soil to the rear and out of the narrow band, thus, leaving strips where no fractured soil is left in the band.

Those concerned with these and other problems recognize the need for an improved wavy coulter.

DISCLOSURE OF THE INVENTION

The present invention provides a wavy coulter having a plurality of waves, each wave defined by a crest and an adjacent valley. Each crest and valley extends back from the peripheral edge of the coulter in respective adjacent lines disposed at a predetermined acute angle with respect to the radius of the coulter body. The coulter is mounted on an implement frame such that a leading peripheral edge of the coulter rotates in a downward direction as it enters the soil, and the lines of each crest and valley enter the soil at a nearly vertical orientation. A uniform narrow band of fractured soil is, thus, prepared by the coulter since soil compaction is minimized.

An object of the present invention is the provision of an improved wavy coulter.

Another object is to provide a wavy coulter that minimizes soil compaction and forms a uniform band of fractured soil.

A further object of the invention is the provision of a wavy coulter having the crests and valleys of each wave positioned to extend back from the peripheral edge at a predetermined acute angle from a radial line.

BRIEF DESCRIPTION OF THE DRAWINGS

These and other attributes of the invention will become more dear upon a thorough study of the following description of the best mode for carrying out the invention, particularly when reviewed in conjunction with the drawings, wherein:

FIG. 1 is a side elevational view of the wavy coulter of the present invention rotatably attached to a portion of an implement frame;

FIG. 2 is a side elevational view of the wavy coulter in a working position in the soil; and FIG. 3 is a top plan view thereof.

BEST MODE FOR CARRYING OUT THE INVENTION

Referring now to the drawings, wherein like reference numerals designate identical or corresponding parts throughout the several views, FIG. 1 shows the wavy coulter (10) of the present invention attached to an implement frame member (2) via a rotatable hub (4). Although not shown in the drawings, it is to be understood that the coulter (10) will generally be positioned to enter and work the soil (6) forward of a no-till implement such as a planter or ammonia knife.

As most dearly shown in FIGS. 2 and 3, the coulter (10) includes a circular body (12), having a peripheral edge (14), a center portion (16) and a radius (18). The center portion (16) has a hub-receiving central opening (22) and a number of bolt-receiving openings (24) spaced around the central opening (22).

A number of waves (30) are formed in the circular body (12), and each wave (30) includes a crest (40) and an adjacent valley (50) that defines a wave width (60) as shown in FIG. 3. Each crest (40) and adjacent valley (50) extends back from the peripheral edge (14) in respective adjacent lines (45 and 55) which are disposed at an acute angle (70) of about 30° with respect to the radius (18) as is shown in FIG. 2. It is to be understood that the wave width (60) may be of various dimensions and the number of waves (30) may vary, but typically the wave width (60) ranges from one to two inches and the number of waves (30) decreases as the wave width (60) increases. Also, it is understood that the acute angle (70) may vary but will typically be in the range of about 15° to 45°, where the smaller angle is preferred when the anticipated working depth is small.

In operation the wavy coulter (10) of the present invention is rotatably attached to an implement frame member (2) and positioned forward of a no-till implement. The plane of the coulter body (12) is aligned with the direction of travel (80) of the implement over the soil (6) to be tilled and the coulter (10) is set to operate at a predetermined soil depth (90) typically two to four inches.

As best shown in FIG. 2, the leading peripheral edge (14) of the coulter (10) rotates in a downward direction as it enters the soil (6) so that the lines (45, 55) of the crests (40) and valleys (50) enter the soil (6) at a nearly vertical orientation. This acts to chop and fracture the soil (6), rather than compact it, thereby forming a uniform band of fractured soil (66) forward of the no-till implement.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A tillage tool, comprising:

an implement frame adapted to move in a direction of travel over soil to be tilled;

a soil engaging coulter operably attached to the frame and positioned forward of a no-till implement operably attached to the frame, the coulter including a circular body, the body having a peripheral edge, a center portion, and a radius;

a plurality of waves formed in the body, each wave including a crest and an adjacent valley defining a wave width at the peripheral edge disposed perpendicular to the direction of travel, each crest and adjacent valley extending back from the peripheral edge in respective adjacent lines disposed at a predetermined acute angle with respect to the radius; and a means for rotatably attaching the center portion of the coulter body to the frame such that a leading peripheral edge of the coulter rotates in a downward direction as it enters the soil, thereby positioning the lines of each crest and valley to enter the soil at a nearly vertical orientation, whereby compaction of the soil is minimized.

2. The tillage tool of claim 1, wherein the predetermined acute angle ranges from about 15° to about 45°.

3. The tillage tool of claim 2, wherein the predetermined acute angle ranges from about 20° to about 40°.

4. The tillage tool of claim 3, wherein the predetermined acute angle is about 30°.

5. A coulter, comprising:

a circular body having a peripheral edge, a center portion, and a radius; and a plurality of waves formed in the body, each wave including a curved crest and an adjacent curved valley defining a wave width at the peripheral edge disposed perpendicular to the plane of the circular body, each crest and adjacent valley extending back from the peripheral edge in respective adjacent lines disposed at a predetermined acute angle with respect to the radius wherein said center portion is adapted to be rotatably attached to an implement frame such that a leading peripheral edge of the coulter rotates in a downward direction as it enters soil, thereby positioning the lines of each crest and valley to enter the soil at a nearly vertical orientation, whereby compaction of the soil is minimized.

6. The tillage tool of claim 5, wherein the predetermined acute angle ranges from about 20° to about 40°.

7. The tillage tool of claim 6, wherein the predetermined acute angle is about 30°.

* * * * *